US009363746B2

(12) United States Patent
Jang et al.

(10) Patent No.: US 9,363,746 B2
(45) Date of Patent: Jun. 7, 2016

(54) METHOD AND APPARATUS FOR SELECTING WIRELESS LOCAL AREA NETWORK TO BE ACCESSED BY A USER EQUIPMENT WITHIN A CELL IN A MOBILE COMMUNICATION SYSTEM

(71) Applicant: Samsung Electronics Co., Ltd., Gyeonggi-do (KR)

(72) Inventors: Jae-Hyuk Jang, Gyeonggi-do (KR); Soeng-Hun Kim, Gyeonggi-do (KR); Sang-Bum Kim, Gyeonggi-do (KR); Kyeong-In Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 104 days.

(21) Appl. No.: 14/166,261

(22) Filed: Jan. 28, 2014

(65) Prior Publication Data

US 2014/0211776 A1 Jul. 31, 2014

(30) Foreign Application Priority Data

Jan. 28, 2013 (KR) ........................ 10-2013-0009430

(51) Int. Cl.
*H04W 4/00* (2009.01)
*H04W 48/20* (2009.01)
*H04W 48/16* (2009.01)
*H04W 84/12* (2009.01)
*H04W 88/06* (2009.01)

(52) U.S. Cl.
CPC .............. *H04W 48/20* (2013.01); *H04W 48/16* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2005/0153692 A1* | 7/2005 | Hwang et al. | 455/434 |
| 2006/0034236 A1* | 2/2006 | Jeong et al. | 370/338 |
| 2011/0103318 A1* | 5/2011 | Ekici et al. | 370/329 |
| 2011/0222523 A1* | 9/2011 | Fu et al. | 370/338 |
| 2012/0044915 A1* | 2/2012 | Oerton | 370/338 |
| 2012/0252516 A1* | 10/2012 | Miyabayashi et al. | 455/515 |
| 2013/0137423 A1* | 5/2013 | Das et al. | 455/426.1 |
| 2013/0242965 A1* | 9/2013 | Horn et al. | 370/338 |
| 2014/0079022 A1* | 3/2014 | Wang et al. | 370/331 |
| 2014/0113621 A1* | 4/2014 | Lerenius et al. | 455/426.1 |
| 2014/0133294 A1* | 5/2014 | Horn et al. | 370/230 |

* cited by examiner

*Primary Examiner* — Anh-Vu Ly
(74) *Attorney, Agent, or Firm* — The Farrell Law Firm, P.C.

(57) ABSTRACT

A method and apparatus for selecting a wireless Local Area Network (LAN) within a cell to be accessed by a User Equipment (UE) in a mobile communication system are provided. The method includes performing, when a request for information regarding wireless LAN Access Points (APs) within the cell is received, a search for the wireless LAN APs and transmitting a report indicating a search result to a serving Evolved Node B (ENB); receiving, from the serving ENB, updated information on wireless LAN APs based on report indicating the search result; determining whether to perform a re-search for the wireless LAN APs based on the updated information on the wireless LAN APs; and performing, in response to determination to perform the re-search for the wireless LAN APs, the re-search and selecting APs to be accessed based on a result of the re-search.

16 Claims, 12 Drawing Sheets

US 9,363,746 B2

METHOD AND APPARATUS FOR SELECTING WIRELESS LOCAL AREA NETWORK TO BE ACCESSED BY A USER EQUIPMENT WITHIN A CELL IN A MOBILE COMMUNICATION SYSTEM

PRIORITY

This application claims priority under 35 U.S.C. §119(a) to Korean Application Serial No. 10-2013-0009430, which was filed in the Korean Intellectual Property Office on Jan. 28, 2013, the entire content of which is incorporated herein by reference.

BACKGROUND OF THE INVENTION

1. Field of the Invention

The present invention relates to a method and an apparatus for selecting a wireless local area network within a cell to be accessed by a user equipment in a mobile communication system.

2. Description of the Related Art

Due to the recent rapid development of wireless communication technology, mobile communication system technology also has evolved. Examples of such mobile communication systems include a Universal Mobile Telecommunications System (UMTS) corresponding to a $3^{rd}$ generation mobile communication technology and a Long Term Evolution (LTE) system having a spotlight as a $4^{th}$ generation mobile communication technology. Further, as the distribution of smart phones expands, data use users also significantly increases. Accordingly, mobile communication network service providers attempt to distribute data of the users by interworking wireless Local Area Networks (LANs), in addition to conventional mobile communication networks, in order to cope with the significantly increasing data usage.

However, in an environment where a current mobile communication network and the wireless LAN interwork with each other, the mobile communication network and the wireless LAN independently work, except for some limited functions (e.g., authentication). Accordingly, when a User Equipment (UE) desires to use a wireless LAN, the UE is required to continuously search for neighboring wireless LANs, since the UE cannot know a position of the corresponding wireless LAN. Further, in order to search for the wireless LAN, power must be supplied to a wireless LAN communication unit of the UE, which increases overall power consumption of the UE.

Further, even when a UE cannot easily access a wireless LAN, the UE attempts to access the wireless LAN increase power consumption and delays. For example, when the user finds a neighboring wireless LAN while the user is travelling by car and waits for a traffic light to change, the UE may attempt to access a found wireless LAN. In this case, problems may occur in which the UE attempts to search for and access unnecessary wireless LANs when the light changes and the user moves again.

SUMMARY OF THE INVENTION

The present invention has been made to address at least the above-mentioned problems and/or disadvantages and to provide at least the advantages described below. Accordingly, an aspect of the present invention provides a method and an apparatus for, when a mobile communication network and a wireless Local Area Network (LAN) interwork with each other in a mobile communication system, providing information for searching for wireless LANs which a User Equipment (UE) will access and then searching for and selecting accessible wireless LANs.

In accordance with an aspect of the present invention, a method of selecting a wireless Local Area Network (LAN) to be accessed by a User Equipment (UE) will access in a mobile communication system is provided. The method includes performing, when a request for information regarding wireless LAN Access Points (APs) within the cell is received, a search for the wireless LAN APs and transmitting a report indicating a search result search to a serving Evolved Node B (ENB); receiving, from the serving ENB, updated information on wireless LAN APs based on report indicating the search result; determining whether to perform a re-search for the wireless LAN APs based on the updated information on the wireless LAN APs; and performing, in response to determination to perform the re-search for the wireless LAN APs, the re-search and selecting APs to be accessed based on a result of the re-search.

In accordance with another aspect of the present invention, a method of selecting a wireless Local Area Network (LAN) to be accessed by a User Equipment (UE) within a cell in a mobile communication system is provided. The method includes transmitting, to the UE, a request for information regarding wireless LAN (Access Points) APs within the cell; updating, when a result of a search for the wireless LAN APs is received from the UE, pre-stored information regarding the wireless LAN APs based on the received search result; and transmitting the updated information regarding the wireless LAN APs to the UE.

In accordance with another aspect of the present invention, an apparatus for selecting a wireless Local Area Network (LAN) which a User Equipment (UE) within a cell in a mobile communication system is provided. The apparatus includes a transceiver configured to receive, from a serving Evolved Node B (ENB), a request for information regarding wireless LAN Access Points (APs) within the cell; a controller configured to control, when the transceiver receives the request for the information regarding the wireless LAN APs, the transceiver to perform a search for the wireless LAN APs, to transmit a report about a search result to the serving ENB, and to receive updated information on the wireless LAN APs based on the transmitted report from the serving ENB, determine whether to perform a re-search for the wireless LAN APs based on the updated information on the wireless LAN APs, and select, in response to a determination to perform the re-search, wireless LAN APs to be accessed based on a result of the re-search.

In accordance with another aspect of the present invention, a serving Evolved Node B (ENB) for selecting a wireless Local Area Network (LAN) within a cell which a User Equipment (UE) will access in a mobile communication system is provided. The serving ENB includes a transceiver configured to transmit, to the UE, a request for information regarding wireless LAN (Access Points) APs within the cell; and a controller configured to update, when a result of the search for the wireless LAN APs is received from the UE, pre-stored information regarding the wireless LAN APs based on the search result, and control the transceiver to transmit the updated information regarding the wireless LAN APs to the UE.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Hereinafter, operation principles of embodiments of the present invention are described in detail with reference to accompanying drawings. The terms and words used in the following description and claims are not limited to their dictionary meanings, but are merely used to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

Hereinafter embodiments of the present invention are described with reference to an LTE system as an example of a mobile communication network for the convenience of a description. However, embodiments of the present invention may be equally applied to other mobile communication networks.

Figure 1:
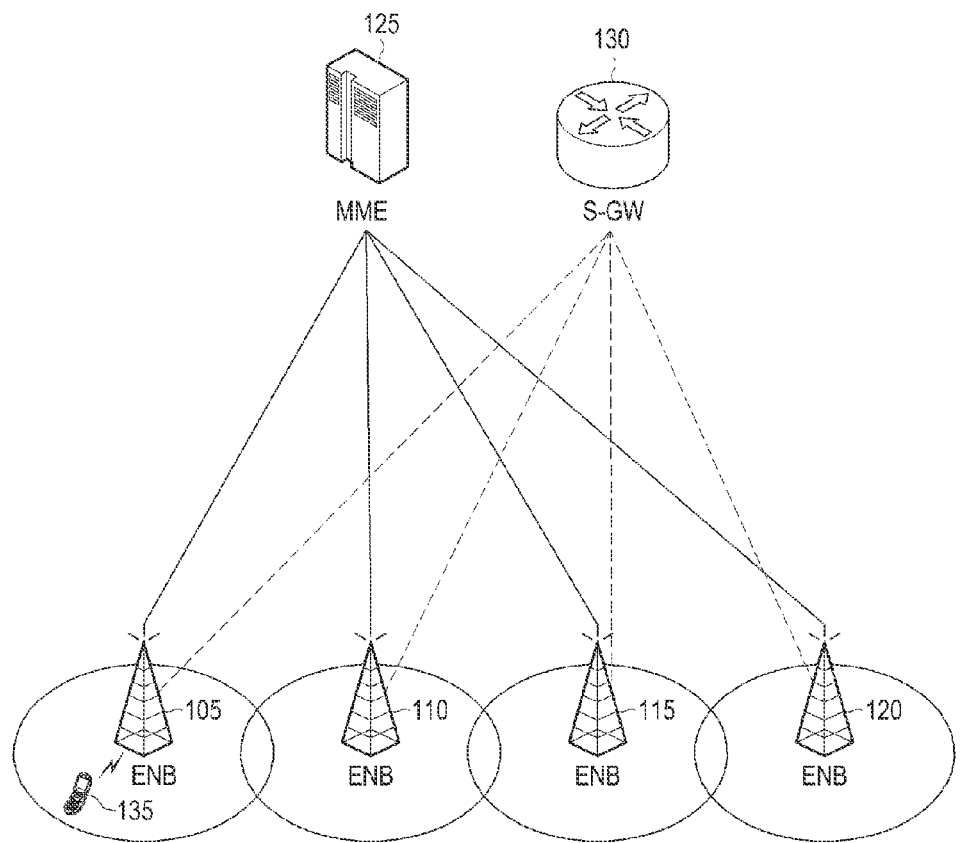
FIG. 1 is a diagram illustrating a structure of an LTE system according to an embodiment of the present invention.

FIG. 1 illustrates an example of a structure of an LTE system according to an embodiment of the present invention.

Referring to FIG. 1, for example, a radio access network of the LTE system includes Evolved Node Bs (ENBs) 105, 110, 115, and 120, a Mobility Management Entity (MME) 125, and a Serving-GateWay (S-GW) 130. A User Equipment (UE) 135 accesses an external network through the ENBs 105, 110, 115, and 120 and the S-GW 130.

The ENBs 105, 110, 115, and 120 may be, for example, node Bs of the UMTS system. However, the ENB 105 is connected to the UE 135 through a radio channel and performs a more complex function in comparison with the conventional node B. In the LTE system, all user traffics including a real time service such as a Voice over Internet Protocol (VoIP) through an IP are serviced through a shared channel. Accordingly, the ENBs 105, 110, 115, and 120 collect state information of the UEs within their service coverages to perform a scheduling, respectively. At this time, the state information includes a buffer state, an available transmission power state, and a channel state. Each of the ENBs 105, 110, 115, and 120 generally controls a plurality of cells. For example, in order to implement a transmission rate of 100 Mbps, the LTE system uses an Orthogonal Frequency Division Multiplexing (OFDM) scheme in a 20 MHz bandwidth as a radio access technology. Further, each of the ENBs 105, 110, 115, and 120 employ a modulation scheme corresponding to a channel state of the corresponding UE and an Adaptive Modulation & Coding (AMC) scheme for determining a channel coding rate.

The S-GW 130 is a device that provides data bearer, and generates or removes the data bearer according to a control of the MME 125. The MME 125 is a device that performs various control functions as well as a mobility management function for the UE and is connected to a plurality of ENBs, for example, the ENBs 105, 110, 115, and 120.

Figure 2:
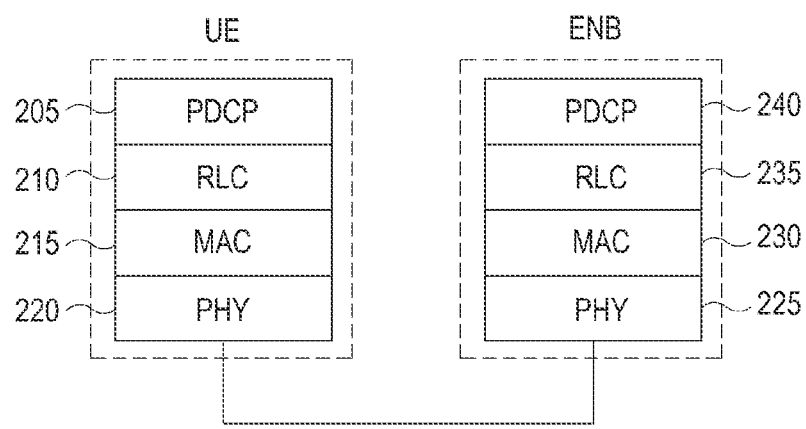
FIG. 2 is a diagram illustrating a structure of a wireless protocol of an LTE system according to an embodiment of the present invention.

FIG. 2 illustrates an example of a structure of a wireless protocol of an LTE system according to an embodiment of the present invention.

Referring to FIG. 2, the wireless protocol of the LTE system includes, in a UE and an ENB, respectively, Packet Data Convergence Protocol (PDCP) layers 205 and 240, Radio Link Control (RLC) layers 210 and 235, Medium Access Control (MAC) layers 215 and 230, and PHYsical (PHY) layers 220 and 225. The PDCP layers 205 and 240 compress/reconstruct an IP header, and the RLC layers 210 and 235 reconfigure a PDCP Packet Data Unit (PDU) to have a predetermined size. The MAC layers 215 and 230 are connected to a plurality of RLC layer devices included in one UE and multiplex RLC PDUs to the MAC PDU and de-multiplexing the RLC PDU from the MAC PDUs. The PHY layers 220 and 225 channel-code and modulate higher layer data to generate an OFDM symbol and transmit the generated OFDM symbol through a radio channel. The PHY layers 220 and 225 also demodulate and channel-decode an OFDM symbol received through the radio channel and transmit the demodulated and channel-decoded OFDM symbol to a higher layer. The PHY layers 220 and 225 use Hybrid Automatic Repeat reQuest (HARQ) to correct errors. When one of the UE and the ENB receives data from the other one of the UE and the ENB, the receiving device sets HARQ ACKnowledgment/Negative ACKnowledgment (ACK/NACK) information indicating whether a packet transmitted by the transmitting device is received as 1 bit and transmits the HARQ ACK/NACK information set within one bit. Downlink HARQ ACK/NACK information for uplink transmission is transmitted through a Physical Hybrid-ARQ Indicator CHannel (PHICH) corresponding to a physical channel. Uplink HARQ ACK/HARQ information for downlink transmission is transmitted through a Physical Uplink Control CHannel (PUCCH) or a Physical Uplink Shared CHannel (PUSCH) corresponding to a physical channel.

According to an embodiment of the present invention, a method of interworking the LTE system and the wireless LAN is provided in order to manage power consumption of the UE and to manage network loads.

Methods according to a first embodiment of the present invention are described as follows with reference to FIGS. 3-5.

Figure 3:
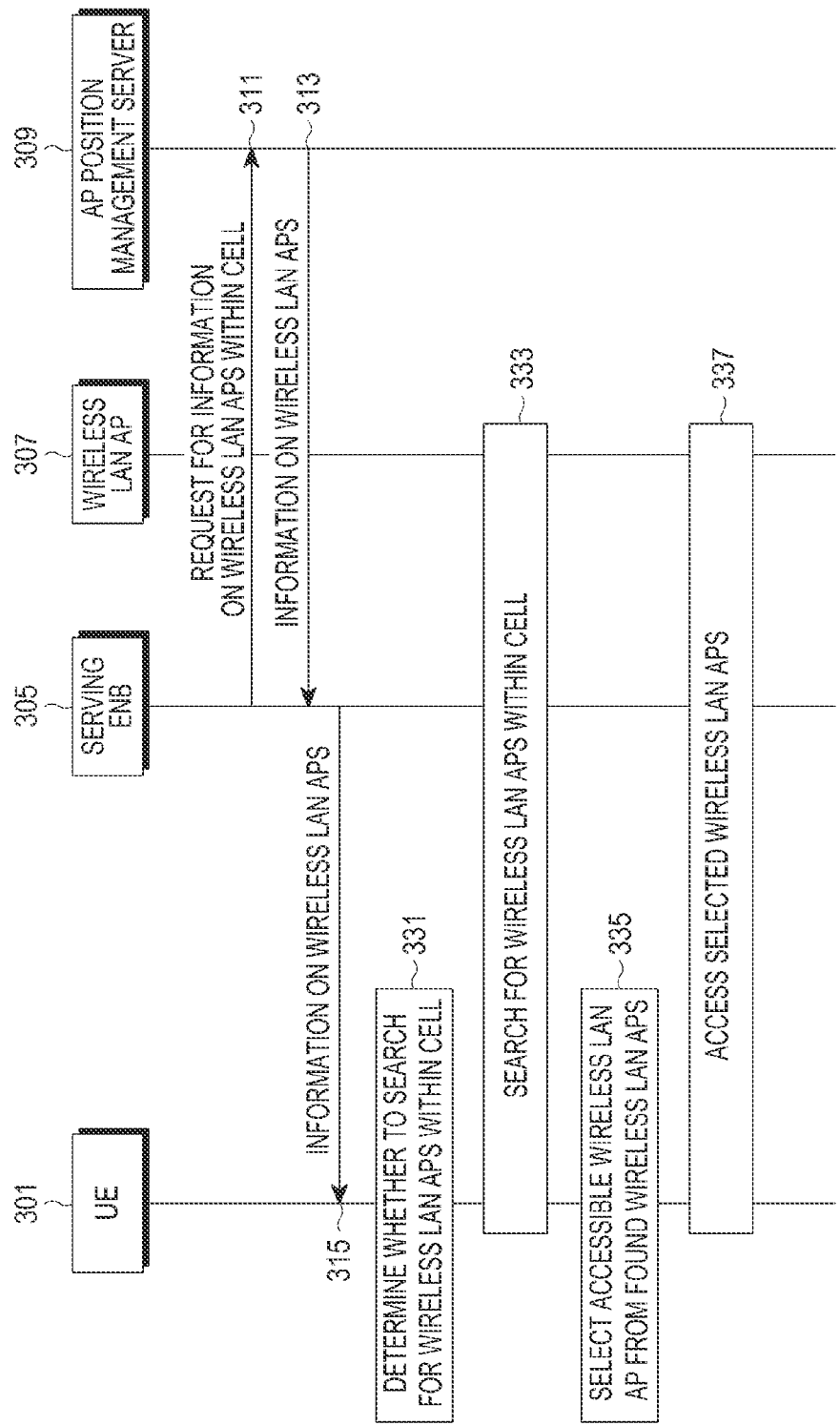
FIG. 3 is an operation flowchart illustrating a method performed in a communication system according to a first embodiment of the present invention.

FIG. 3 is an operation flowchart illustrating a method performed in a communication system according to a first embodiment of the present invention. According to the first embodiment of the present invention, an Access Point (AP) position management server 309 manages a position of a wireless LAN AP operated by a service provider in an LTE system as an example of a mobile communication network. More specifically, the AP position management server 309 maps and manages positions of the wireless LAN APs, which are installed by the service provider (not shown), and are located within respective service coverages of ENBs included in the LTE system that includes the AP position management server 309.

Referring to FIG. 3, each of the ENBs within the mobile communication network, such as, the serving ENB 305, for example, transmits, to the AP position management server 309, a request for information regarding wireless LAN APs within the cell, in order to determine whether there are wireless LAN APs located within a service coverage area of the serving ENB 305 (i.e., a service coverage area of the cell), in step 311. In step 313, the AP position management server 309 transmits the information regarding the wireless LAN APs mapped with the serving ENB 305 to the serving ENB 305. The information regarding the wireless LAN APs includes information indicating whether there are wireless LAN APs mapped with a corresponding serving ENB, as well as detailed information on positions of the wireless APs when such mapped wireless LAN APs exist.

Meanwhile, according to another embodiment of the present invention, each ENB in step 311 does not separately transmit the request for the information regarding the wireless LAN APs within the cell to the AP position management server 309. Instead, the AP position management server 309 may transmit information regarding the corresponding wireless LAN AP to the corresponding ENB at random times or according to a preset time. The detailed information may include a list of wireless LAN APs within the service coverage of the corresponding ENB, that is, the cell, wireless LAN identifiers of the wireless LAN APs, and wireless LAN channel numbers (frequency information) used by the corresponding wireless LAN APs.

The wireless LAN identifiers may include identifiers defined according to Table 1 below.

TABLE 1

| Wireless LAN identifier | Definition |
| --- | --- |
| SSID (Service Set Identifier) | Corresponds to text having length of 32 bytes and identifier generally recognized when user searches for wireless LAN |
| BSSID (Basic Service Set Identifier) | Has length of 6 bytes and corresponds to address of MAC layer used by each wireless LAN AP |
| HESSID (Homogenous Extended Service Set ID) | Has length of 6 bytes and corresponds to address of MAC layer of representative AP among wireless LAN APs operated by same service provider |

In step 315, the serving ENB 305 transmits the information regarding the wireless LAN APs received from the AP position management server 309 to the UE 301. The transmission scheme used in step 315 may be a broadcast scheme or a unicast scheme. When the broadcast scheme is used, such as when the mobile communication network broadcasts other System Information (SI), the serving ENB 305 may broadcast the information on the wireless LAN APs to all UEs located within the cell by using a predetermined SI block or by informing each of the UEs of the information on the wireless LAN APs by using a Radio Resource Control (RRC) layer message. The information regarding the wireless LAN APs may further include frequency channel information used by the wireless LAN AP that can be found by the serving ENB 305, in addition to information included in the information regarding the wireless LAN APs described herein with reference to step 313.

In step 331, the UE 301 determines whether to search for wireless LAN APs within the cell based on the information regarding the wireless LAN APs. For example, when the information regarding the wireless LAN APs includes information indicating that the wireless LAN AP managed by the service provider does not exist within the cell of the serving ENB 305, the UE 301 determines whether an operation button for searching for the wireless LAN AP has been set. In the present example, the operation button is set to not perform the operation of searching for the wireless LAN AP within the cell, even though the operation button is turned on. Further, when the information regarding the wireless LAN APs includes information indicating that the wireless LAN APs exist within the cell of the serving ENB 305 and indicating the operation button is turned off, the UE 301 may inform the user of the UE 301 that an accessible wireless LAN AP exists within the cell and inquire about whether to turn on the operation button.

Meanwhile, according to another embodiment of the present invention, when the UE 301 receives the information regarding the wireless LAN APs according to an arrangement preset by the service provider and the operation button is turned off, the user may set the operation button to be automatically turned on and attempt an access to the wireless LAN AP within the cell.

Meanwhile, according to another embodiment of the present invention, the UE 301 may determine whether to search for the wireless LAN APs by using only the received information regarding the wireless LAN APs or by using information that the UE 301 already possesses, through the mobile communication network as well as the information regarding the wireless LAN APs. For example, the information may include movement speed information of the UE 301. More specifically, when the UE 301 detects that its own speed is relatively fast, the UE 301 may not need a handover to a wireless LAN that has a smaller service coverage than the service coverage of the mobile communication network. Accordingly, although the UE 301 receives the information regarding the wireless LAN APs from the serving ENB 305, the UE 301 can search for the wireless LAN APs within the cell, only when the movement speed is less than or equal to a predetermined reference. Examples of conditions that allow the movement speed to be less than or equal to the predetermined reference are shown in Table 2 below.

TABLE 2

| type | Detailed conditions |
| --- | --- |
| 1 | Case where time for which UE does not perform cell change (or handover) in mobile communication network is longer than or equal to minimum cell non-change time threshold (x ms) |
| 2 | Case where time for which UE stays within cell of mobile communication network exceeds minimum stay time threshold (y ms) |
| 3 | Case where UE speed based on Global Navigation Satellite System (GNSS) measured within preset period (z ms) is slower than or equal to speed threshold (w km/h) |

TABLE 2-continued

| type | Detailed conditions |
|---|---|
| 4 | Case where change in Reference Signal Received Power (RSRP) for predetermined time (k ms) is smaller than or equal to reference change amount (j dB) |

When wireless LAN information directly input by the user of the UE 301 other than the conditions included in Table 2 above exist, the UE 301 may search for the wireless LAN APs within the cell of the serving ENB 305, regardless of whether the conditions are satisfied.

In the present example the UE 301 determines to search for the wireless LAN APs within the cell of the serving ENB 305 in consideration of the above-described conditions with respect to Table 2. In step 333, in response to a determination to perform a search, the UE 301 searches for the wireless LAN APs within the cell. The search for the wireless LAN APs may be performed using the information regarding the wireless LAN APs received in step 315. For example, when the UE 301 acquires identifiers of particular wireless LAN APs and acquires particular frequency channel information from the information on the wireless LAN APs, the UE 301 searches for only the wireless LAN APs that correspond to the particular wireless LAN identifiers and the particular frequency channel information, without additionally searching for all the APs with respect to all frequencies. The search for the wireless LAN APs may include passive scanning and active scanning. When passive scanning is used, the UE 301 passively receives a beacon transmitted by the APs operating in the corresponding channel for a predetermined time and searches for the APs within the cell. By contrast, when the active scanning is used, the UE 301 transmits a probe request message through the corresponding channel and determines which APs are transmitting a probe response message from among the APs that have received the probe request message as the APs within the cell. The beacon and the probe response message have nearly the same format. Through the beacon and the probe response message, the UE 305 may acquire wireless LAN identifiers (e.g., Basic Service Set IDentifier (BSSID), Service Set IDentifier (SSID), Homogenous Extended Service Set IDentifier (HESSID), etc.) of the APs that have received the beacon or the probe response message and load information for each AP.

Thereafter, in step 335, the UE 301 determines accessible APs from among the found wireless LAN APs. In a concrete determination method, a wireless LAN AP that satisfies a condition in which signal intensity received from each of the found wireless LAN APs is at least equal to a signal intensity threshold, or a condition in which AP load information included in the signal transmitted by the corresponding wireless LAN AP is less than or equal to a load threshold is determined as to be an accessible AP. When there is a plurality of accessible APs, the UE selects the AP that has a maximum signal intensity threshold value or a minimum load information. When a particular wireless LAN AP is selected, the UE 301 performs a process of accessing the particular wireless LAN AP, in step 337. The access process includes authentication and association processes through which the UE 301 accesses the particular wireless LAN AP selected from the wireless LAN APs located within the cell of the serving ENB 305 to transmit/receive data.

Figure 4:
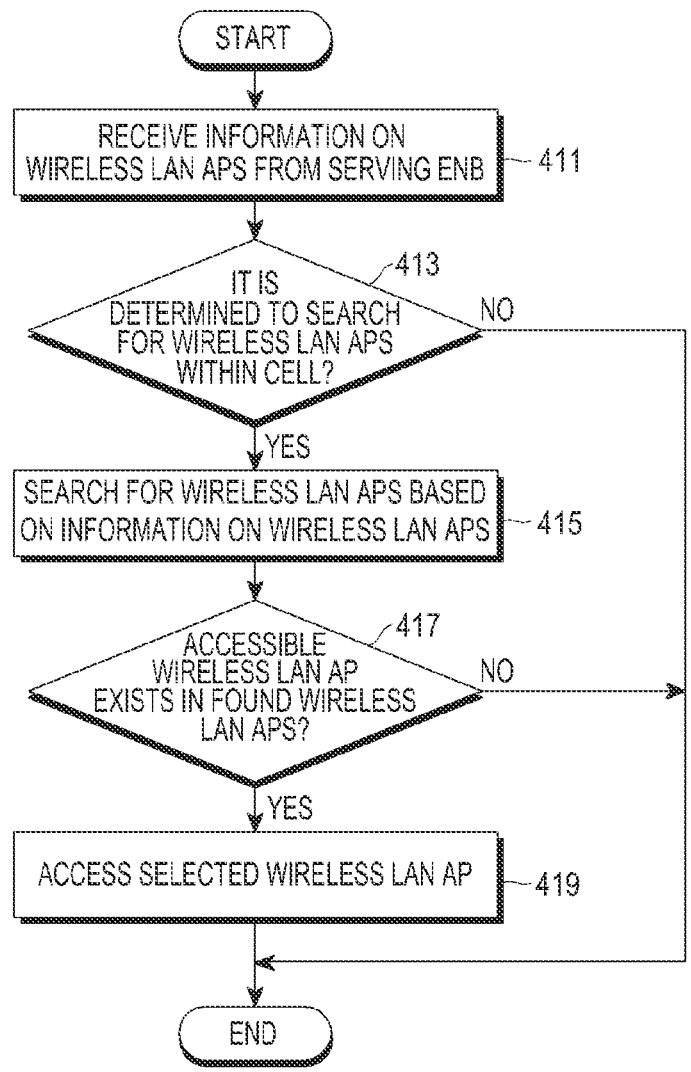
FIG. 4 is an operation flowchart illustrating a method performed by a UE according to the first embodiment of the present invention.

FIG. 4 is an operation flowchart illustrating a method performed by a UE according to the first embodiment of the present invention.

Referring to FIG. 4, the UE receives information regarding wireless LAN APs from the serving ENB, in step 411, and proceeds to step 413. As described with reference to FIG. 3, the information regarding the wireless LAN APs may include information indicating, through one bit, whether wireless LAN APs exist within the cell, detailed information regarding positions of the wireless LAN APs i.e., a list of the wireless LAN APs within the cell, wireless LAN AP identifiers, and wireless LAN channel numbers (frequency information) used by the APs.

In step 413, the UE determines whether to search for the wireless LAN APs within the cell according to the information regarding the wireless LAN APs, a UE speed, and a user setting. More specifically, the UE determines whether to search for the wireless LAN APs within the cell based on whether the information regarding the wireless LAN APs includes information indicating whether wireless LAN APs exist within the cell, whether the UE satisfies at least one of the conditions included in Table 2 above, or whether the user of the UE directly has set a particular wireless LAN. Since the determination of step 413 is described herein with respect to step 331 of FIG. 3, a further detailed description thereof is omitted herein.

As a result of the determination of step 413, when the UE determines to search for the wireless LAN APs, the UE searches for the wireless LAN APs within the cell by using the above-described passive scanning or active scanning, in step 415. Since a detailed operation of the searching for wireless LAN APs in step 413 is the same as described herein with respect to step 333 of FIG. 3, a further description thereof is omitted herein.

In step 417, the UE determines whether an accessible AP exists in the found wireless LAN APs. The existence an accessible AP may be determined by comparing signal intensity of the wireless LAN APs found in step 415, load information, such as described with reference to step 335 of FIG. 3. As a result of the determination, upon a determination that an accessible wireless LAN AP exists, step 419 is performed. When a plurality accessible APs exist, the UE selects the AP that has a maximum signal intensity threshold value or that has a minimum load information value. In step 419, the UE accesses the selected wireless LAN AP. The access process is also performed through authentication and association processes described herein with reference to step 337 of FIG. 3. Accordingly, the UE accesses the wireless LAN AP to transmit/receive data.

Meanwhile, when no wireless LAN APs are found in step 413, or when no accessible wireless LAN APs are found in step 417, the operation ends.

Figure 5:
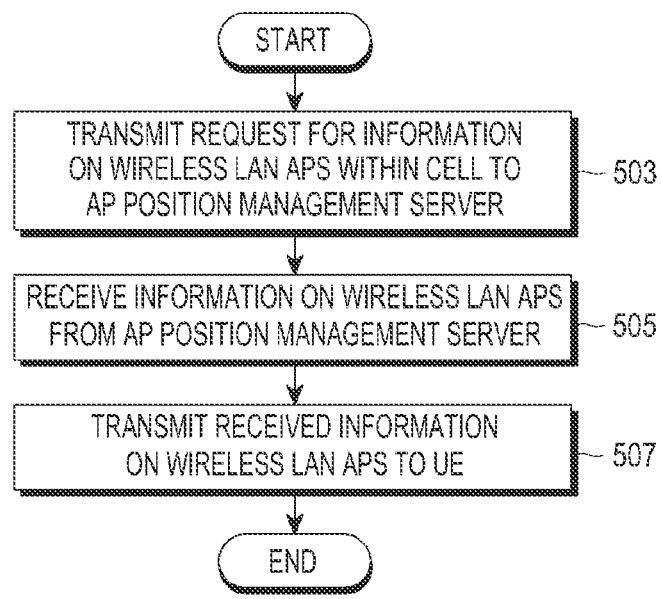
FIG. 5 is an operation flowchart illustrating a method performed by a serving ENB according to the first embodiment of the present invention.

FIG. 5 is an operation flowchart illustrating a method performed by a serving ENB according to the first embodiment of the present invention.

Referring to FIG. 5, in step 503, the serving ENB transmits a request for information regarding the wireless LAN AP within the cell to the AP position management server installed in the LTE system, such as described with reference to FIG. 3. In step 505, the serving ENB receives information regarding the wireless LAN APs operated by the service provider within the cell of the serving ENB from the AP position management server and proceeds to step 507. As described with reference to FIG. 3, the wireless LAN AP related information may include information indicating, through one bit, whether wireless LAN APs exist in the cell, detailed information on a wireless LAN AP position i.e., a list of wireless LAN APs within the cell, wireless LAN identifiers of the wireless LAN APs, and a wireless LAN channel number (frequency information) used by the corresponding wireless LAN AP.

In step 507, the serving ENB transmits the wireless LAN AP related information to the UE. The wireless LAN AP related information may be transmitted according to a broadcast scheme or a unicast scheme, such as described herein with respect to step 315 of FIG. 3.

In the above-described first embodiment of the present invention, the AP position management server that manages positions of the wireless LAN APs located within the cell of each of the ENBs located within the mobile communication network is separately installed. According to an embodiment of the present invention, the AP position management server transmits the information regarding the wireless LAN APs located within the cell of the ENB that is mapped with the ENB to the corresponding ENB according to reception of a request or according to a preset period. When the ENB has received the information regarding the wireless LAN APs, the ENB transmits the information regarding the wireless LAN APs to UEs located within the cell of the ENB, and thus enables the UE to efficiently select the wireless LAN AP within the cell of the ENB. More specifically, the UE searches for the wireless LAN AP within the cell based on the information regarding the wireless LAN APs. Accordingly, the wireless LAN AP search is performed under an optimal condition that reduces unnecessary power consumption.

A second embodiment of the present invention is described as follows with reference to FIGS. 6 through 8.

Figure 6:
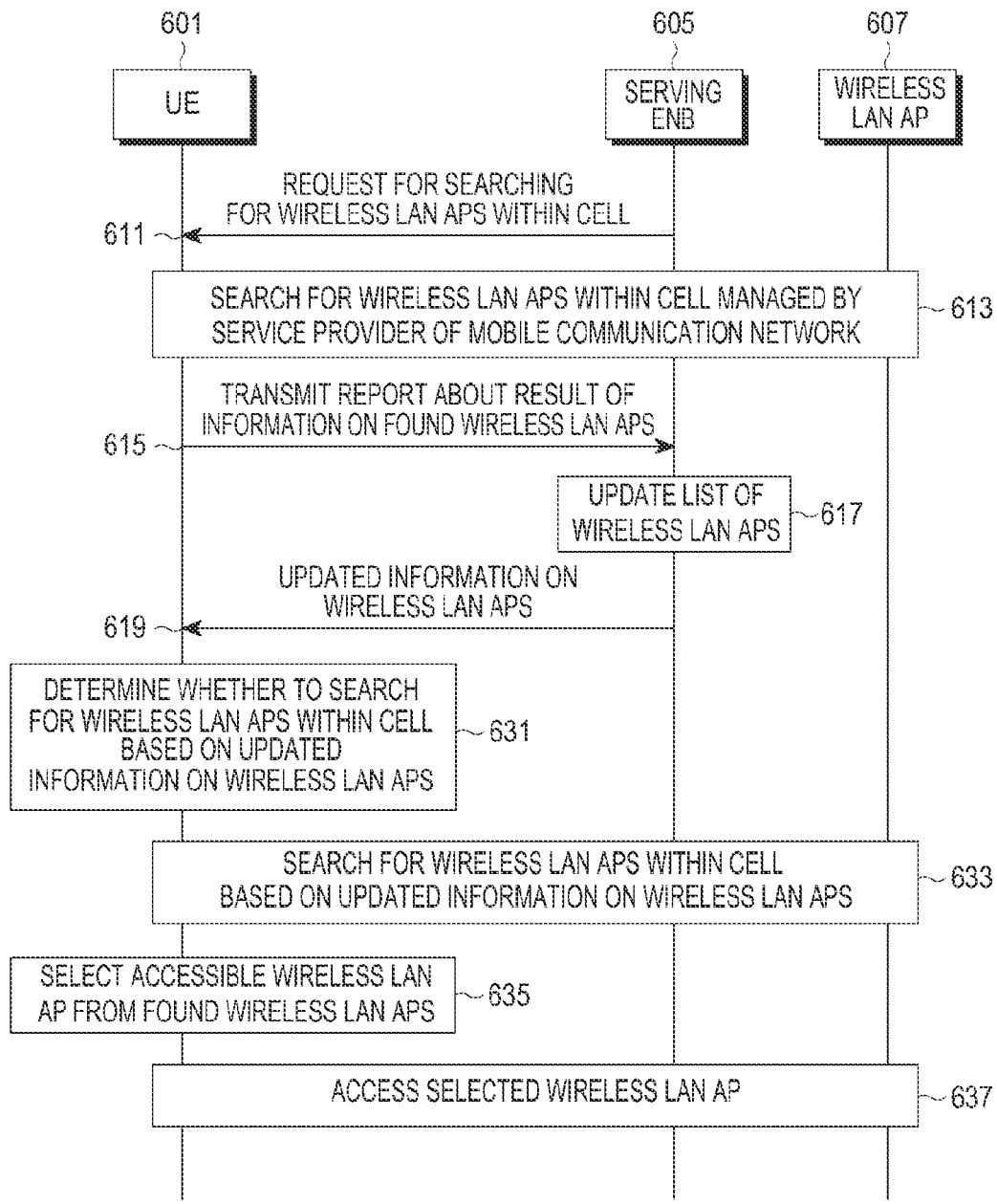
FIG. 6 is an operation flowchart illustrating a method performed in a communication system according to a second embodiment of the present invention.

FIG. 6 is an operation flowchart illustrating a method performed in a communication system according to a second embodiment of the present invention. In the second embodiment of the present invention, the serving ENB transmits a request for information regarding wireless LAN APs within the cell to the UE, receives a response to the request, and updates wireless LAN APs already managed by the serving ENB, without a separate installation of a server that manages positions of the wireless LAN APs operated by the mobile communication network service provider. Thereafter, the serving ENB provides the updated information on the wireless LAN APs to the UE and thus allows the UE to perform an operation of searching for the wireless LAN APs and selecting the accessible wireless LAN APs based on the updated information regarding the wireless LAN APs.

Referring to FIG. 6, in step 611, a serving ENB 605 transmits, to a UE 604, a request to search for information regarding wireless LAN APs within the cell, to collect a list of the wireless LAN APs located within a service coverage of the ENB 605, i.e., the cell. The search request may be transmitted using an RRC layer message. The search request may include wireless LAN AP identifiers indicating particular wireless LAN APs included in the list of wireless LAN APs managed by the serving ENB 605 and wireless LAN channel numbers (frequency information). The wireless LAN AP identifier may include the SSID, the BSSID, or the HESSID defined in Table 1.

In step 613, the UE 601 searches for wireless LAN APs in order to identify whether wireless LAN APs that are managed by the service provider of the mobile communication network including the serving ENB 605 exist within the cell of the serving ENB 605. The process of searching for the wireless LAN APs is performed by passive scanning or the active scanning for only the wireless LAN APs that correspond to the wireless LAN identifiers included in the search request.

In step 615, the UE 601 transmits, to the serving ENB 605, a result report including information regarding the wireless LAN APs found through the wireless LAN AP search process. The result report may be transmitted by using, for example, an RRC layer message. The information regarding the wireless LAN APs is acquired through the beacon or the probe response message received from the corresponding wireless LAN AP by passive scanning or active scanning. For example, the information on the wireless LAN APs includes wireless LAN identifiers (e.g., SSID, BSSID, or HESSID) of the found wireless LAN APs, wireless LAN frequency channel numbers used by the found wireless LAN APs, load information of the found wireless LAN APs, information on whether the found wireless LAN APs are connected to the Internet, and authentication types of the found wireless LAN APs. In step 617, the serving ENB 605 updates a list of the wireless LAN APs managed by the serving ENB 605 by using the information on the wireless LAN APs. When the information on the wireless LAN APs stored in the wireless LAN AP list is modified according to the information regarding the wireless LAN APs, the serving ENB 605 changes the stored wireless LAN AP information to latest information acquired from the information on the wireless LAN APs. Further, when the serving ENB 605 receives information indicating a new wireless LAN AP from the information on the wireless LAN APs, the serving ENB 605 adds the new wireless LAN AP to the wireless LAN AP list. Further, when the serving ENB 605 identifies, in the information regarding wireless LAN APs, wireless LAN APs that have not been found for a preset time among the wireless LAN APs stored in the wireless LAN AP list, the serving ENB 605 may remove the identified wireless LAN APs from the wireless LAN AP list.

In step 619, the serving ENB 605 transmits, to the UE 601, information regarding the wireless LAN APs including the updated wireless LAN AP list. The transmission scheme used in step 619 may be a broadcast or unicast scheme. More specifically, the information regarding the wireless LAN APs may be transmitted to all UEs located within the cell of the serving ENB 605 at one time by using a predetermined SI block similarly to a method of broadcasting another SI in the mobile communication network. Alternatively, the information regarding the wireless LAN APs may be individually transmitted to each of the UE by using an RRC layer message. Accordingly, the serving ENB 605 may inform other UEs located within the cell of the serving ENB 605, in addition to the UE 601, of information regarding the wireless LAN APs by using the RRC layer message in a unicast scheme. The information regarding the wireless LAN APs includes information (one bit) indicating whether the wireless LAN AP operated by the service provider of the LTE system including the serving ENB 605 exist within the cell of the serving ENB 605, wireless LAN AP identifiers (e.g., SSID, BSSID, or HESSID) that are currently found by the serving ENB 605, and frequency channel information used by the corresponding wireless LAN APs.

In step 631, the UE 601 determines whether to search for wireless LAN APs within the cell based on the information on the wireless LAN APs. For example, when the information regarding the wireless LAN APs includes information indicating that the wireless LAN AP managed by the service provider of the mobile communication network including the serving ENB 605 does not exist within the cell of the serving ENB 605, the UE 601 determines whether an operation button for searching for the wireless LAN AP has been set. When the operation button has been turned on, the UE 601 does not search for the wireless LAN APs within the cell. When the information regarding the wireless LAN APs includes information indicating that wireless LAN APs exist within the cell of the serving ENB 305, if the operation button is turned off, the UE 601 may inform the user of the UE 301 that there is an accessible wireless LAN AP within the cell and request a user to determine whether to turn on the operation button. Meanwhile, according another embodiment of the present invention, when the UE 601 receives the information regarding the wireless LAN APs according to an arrangement preset by the service provider, if the operation button is turned off, the user may set the operation button to be automatically turned on and attempt an access to the wireless LAN within the cell.

Meanwhile, according to another embodiment of the present invention, the UE 601 determines whether to search for the wireless LAN AP by using only the received information regarding the wireless LAN APs or by using information that the UE 601 has already possessed through the mobile communication network, as well as the information regarding the wireless LAN APs. For example, when a movement speed of the UE 601 is relatively fast, a handover to the wireless LAN having a smaller service coverage than a service coverage of the mobile communication network may not be needed. Accordingly, although the UE 601 receives the information regarding the wireless LAN APs from the serving ENB 605, the UE 301 searches for the wireless LAN AP within the cell only when the movement speed is less than or equal to a predetermined reference speed. For example, conditions that allow the movement speed to be less than or equal to the predetermined reference speed may correspond to conditions defined in Table 2 above.

When wireless LAN information directly input by the user of the UE 601 includes conditions other than the conditions included in Table 2 above, the UE 601 searches for the wireless LAN AP within the cell of the serving ENB 605, regardless whether such conditions are satisfied.

If the UE 601 determines to search for the wireless LAN AP within the cell of the serving ENB 605 in consideration of the above-described conditions, in step 633, the UE 605 searches for the wireless LAN AP in order to identify whether accessible wireless LAN APs exist within the cell. The search for wireless LAN APs may be performed using the information regarding the wireless LAN APs received in step 615. For example, when the UE 601 acquires identifiers of particular wireless LAN APs and particular frequency channel information from the information on the wireless LAN APs, the UE 601 searches for only the wireless LAN APs corresponding to the particular wireless LAN identifiers and the particular frequency channel information, without searching for all the wireless LAN APs for all frequencies. The search method may uses passive scanning or active scanning described herein above.

In step 635, the UE 601 determines whether there are accessible APs among the found wireless LAN APs. Wireless LAN APs that satisfy a condition in which signal intensity received from each of the found wireless LAN APs is at least equal to a signal intensity threshold or a condition in which AP load information included in the signal transmitted by the corresponding wireless LAN AP is less than or equal to a load threshold are determined as accessible APs. When there is a plurality of accessible APs, the UE selects the AP that has a maximum signal intensity threshold value or a minimum load information value. When a particular wireless LAN AP is selected, the UE 601 accesses to the selected particular wireless LAN AP in step 637. The access process includes authentication and association processes, through which the UE 601 accesses the particular wireless LAN AP to transmit/receive data.

Figure 7:
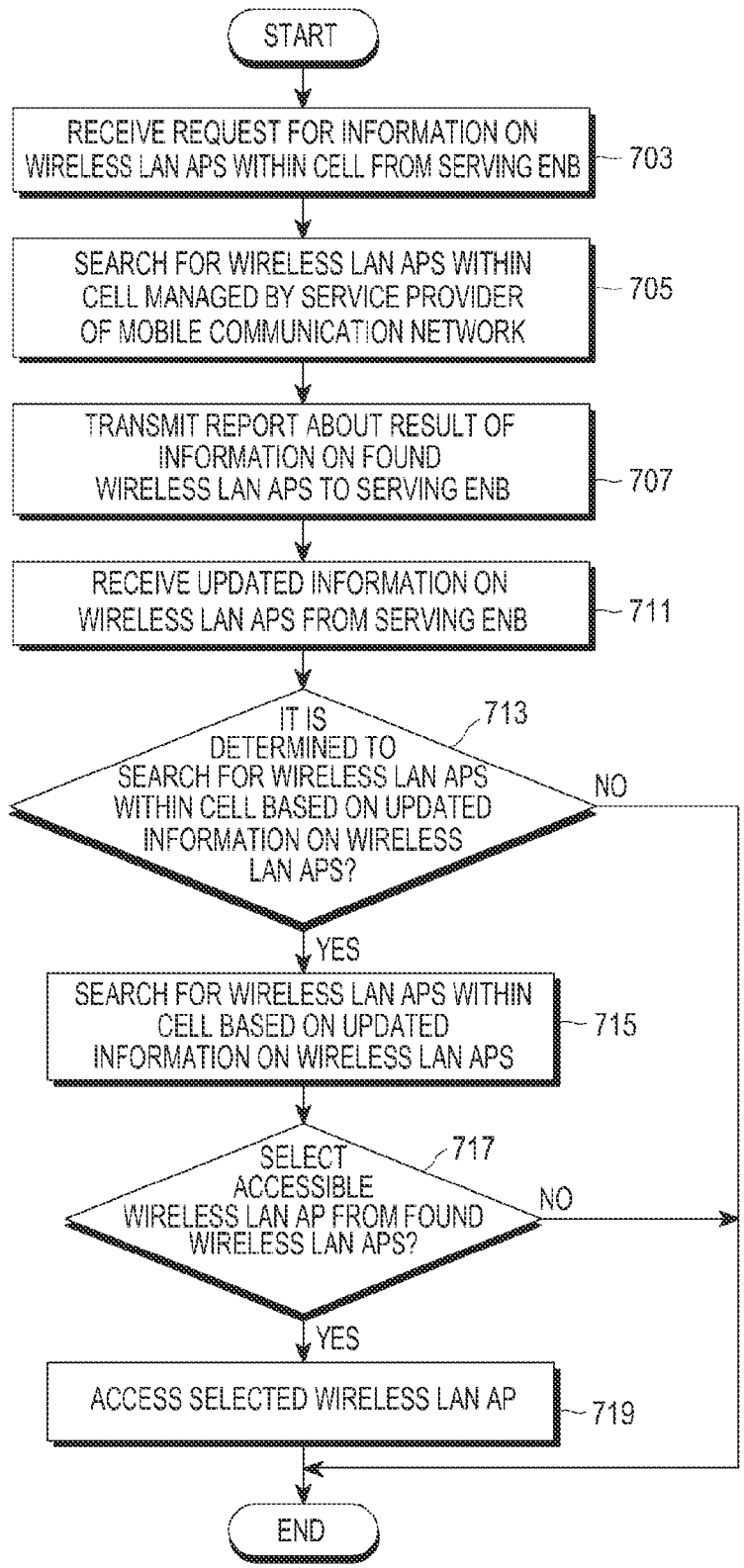
FIG. 7 is an operation flowchart illustrating a method performed by a UE according to the second embodiment of the present invention.

FIG. 7 is an operation flowchart illustrating a method performed by a UE according to the second embodiment of the present invention.

Referring to FIG. 7, the UE receives a request for information on wireless LAN APs within the cell from the serving ENB, in step 703. For example, the information regarding the wireless LAN APs within the cell includes wireless LAN identifiers for identifying particular wireless LAN APs requested by the serving ENB and wireless LAN channel information. The wireless LAN AP identifier includes, for example, the SSID, the BSSID, or the HESSID defined in Table 1.

In step 705, the UE searches for wireless LAN APs in order to identify whether there are any wireless LAN APs within the cell of the serving ENB that are managed by a service provider of the mobile communication network including the serving ENB. The process of searching for the wireless LAN APs is performed by passive scanning or active scanning only for the wireless LAN APs corresponding to wireless LAN identifiers included in the request for searching for the information regarding the wireless LAN APs within the cell.

In step 707, the UE transmits a result report including the information regarding the found wireless LAN APs to the serving ENB. The result report may use, for example, an RRC layer message. The information regarding the wireless LAN APs is acquired through a beacon or a probe response message received from the corresponding wireless LAN AP by the passive scanning or the active scanning. For example, the information on the wireless LAN APs includes wireless LAN identifiers (e.g., SSID, BSSID, or HESSID) of the found wireless LAN APs, wireless LAN frequency channel numbers used by the found wireless LAN APs, load information of the found wireless LAN APs, information indicating whether the found wireless LAN APs are connected to the Internet, and authentication types of the found wireless LAN APs.

In step 711, the UE receives the updated information regarding the wireless LAN APs from the serving ENB. The information regarding the wireless LAN APs includes a list of the updated wireless LAN APs acquired through the same method as that described herein with respect to step 617 of FIG. 6, one bit of information indicating whether the wireless LAN AP operated by a service provider of the LTE system including the serving ENB 605 exists within the cell of the serving ENB 605, wireless LAN AP identifiers (e.g., SSID, BSSID, or HESSID) that can be currently searched for by the serving ENB 605, and frequency channel information used by the corresponding wireless LAN AP.

In step 713, the UE determines whether to search for the wireless LAN APs within the cell according to the information regarding the wireless LAN APs, and the UE speed and the user setting described herein with reference to FIG. 6. More specifically, the UE determines whether to search for the wireless LAN APs within the cell based on the information indicating whether the wireless LAN AP managed by the service provider of the mobile communication network exists within the cell in the received information on the wireless LAN APs, whether a condition in which the UE movement speed is less than or equal to a reference speed value is satisfied, and whether a particular wireless LAN AP directly set by the user of the UE exists. The determination process is performed as described herein with respect to step 631 of FIG. 6. As a result of the determination, when the UE determines not to search for the wireless LAN AP within the cell, the UE terminates the operation.

As a result of the determination, when the UE determines to search for the AP within the cell, the UE searches for the wireless LAN APs within the cell through the above-described passive scanning or active scanning, in step 715. In step 717, the UE determines whether there are any accessible wireless LAN AP among the found wireless LAN APs, according to a process described herein with respect to step 635 of FIG. 6. As a result of the search, when the UE determines that accessible wireless LAN APs do not exist, the UE terminates the operation. However, when the UE determines that an accessible wireless LAN AP exists, the UE accesses the found wireless LAN AP in step 719. The access process includes the authentication and association processes as described in FIG. 3 through which the UE may access the selected wireless LAN AP to transmit/receive data.

Figure 8:
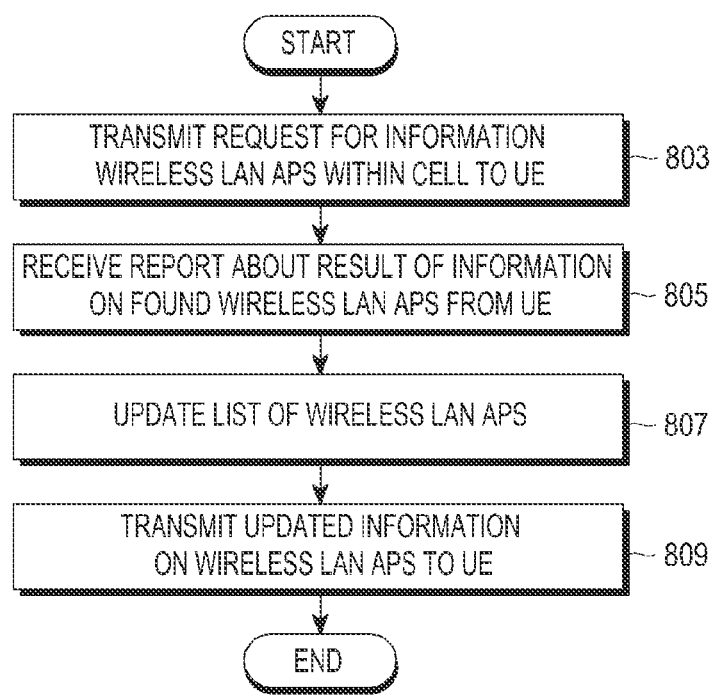
FIG. 8 is an operation flowchart illustrating a method performed by a serving ENB according to the second embodiment of the present invention.

FIG. 8 is an operation flowchart illustrating a method performed by a serving ENB according to the second embodiment of the present invention.

Referring to FIG. 8, the serving ENB transmits, to a UE, a request for information regarding wireless LAN APs within the cell, to collect a list of the wireless LAN APs existing within the cell of the ENB, in step 803. The request for the information regarding the wireless LAN APs within the cell may be transmitted by using an RRC layer message. For example, the request for the information regarding the wireless LAN APs includes wireless LAN identifiers for identifying particular wireless LAN APs requested by the serving ENB and wireless LAN channels (frequency information). The wireless LAN identifier includes, for example, the SSID, the BSSID, or the HESSID defined in Table 1.

Thereafter, in step 805, the serving ENB receives, from the UE, a result report about the information regarding the found wireless LAN APs as a response to the request for the information on the wireless LAN APs within the cell. Alternatively, according to another embodiment of the present invention, the serving ENB may receive the result report from the UE without a separate request for the information regarding the wireless LAN APs. The result report about information regarding the found wireless LAN APs, which are found through the wireless LAN AP search process according to step 613 of FIG. 6, includes, for example, wireless LAN identifiers (e.g., SSID, BSSID, or HESSID) of the found wireless LAN APs, wireless LAN frequency channel numbers used by the found wireless LAN APs, load information of the found wireless LAN APs, whether the found wireless LAN APs are connected to the Internet, and AP authentication types of the found wireless LAN APs.

In step 807, the serving ENB updates the managed wireless LAN AP list by using the information regarding the wireless LAN APs, according to a process described herein with respect to step 617 of FIG. 6.

In step 809, the serving ENB transmits, to the UE, the information regarding the wireless LAN APs including the updated wireless LAN AP list, according to a broadcast or unicast scheme, such as described herein with respect to step 619 of FIG. 6. At this time, the information regarding the wireless LAN APs includes one bit of information indicating whether the wireless LAN AP operated by a service provider of the LTE system including the serving ENB 605 exists within the cell of the serving ENB 605, wireless LAN AP identifiers (e.g., SSID, BSSID, or HESSID) that can be currently searched for by the serving ENB 605, and frequency channel information used by the corresponding wireless LAN AP.

According to the second embodiment of the present invention, the serving ENB transmits the wireless LAN identifiers indicating particular wireless LAN APs included in the wireless LAN AP list already managed by the serving ENB of the mobile communication network and a request for searching for the information on the wireless LAN APs within the cell including the wireless LAN channel number (channel information) to the UE. Accordingly, the UE reduces unnecessary wireless LAN AP searches by searching for the wireless LAN APs based on the information included in the request for searching for the information on the wireless LAN APs within the cell.

A third embodiment of the present invention is described as follows with reference to FIGS. 9 to 11.

Figure 9:
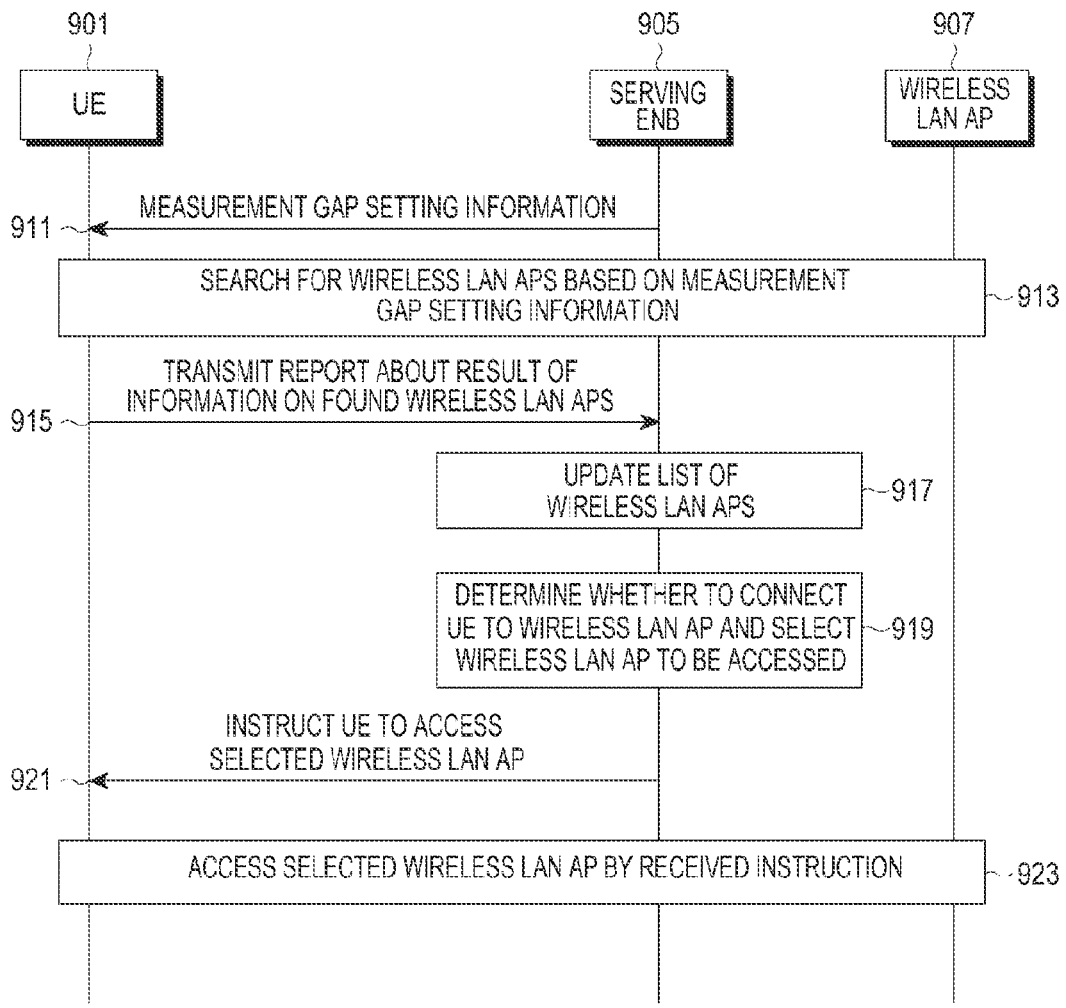
FIG. 9 is an operation flowchart illustrating a method performed in a communication system according to a third embodiment of the present invention.

FIG. 9 is an operation flowchart illustrating a method performed in a communication system according to a third embodiment of the present invention. In the third embodiment of the present invention, in a manner similar to the first embodiment and the second embodiment of the present invention described above, the serving ENB transmits information acquired from the wireless LAN AP position management server or the wireless LAN AP list already managed by the serving ENB to the UE within the cell. Thus, the serving ENB determines whether to directly connect the UE to the wireless LAN AP in consideration of the information on the wireless LAN APs found from the UE and a radio resource condition of the serving ENB and selects a corresponding wireless LAN AP to be accessed and instructs the UE to access the selected wireless LAN AP in response to determining to connect the UE to the wireless LAN AP, rather than simply helping the UE within the cell perform the process of searching for and selecting the wireless LAN APs Referring to FIG. 9, a serving ENB 905 of the mobile communication network transmits measurement gap setting information set to allow a UE 901 to search for only accessible wireless LAN APs to the UE 901 within the cell in step 911. For example, the measurement gap setting information may be transmitted using an RRC layer message. Further, the measurement section setting information includes a time measurement gap, wireless LAN identifiers (e.g., SSID, BSSID, or HESSID), and a corresponding wireless LAN AP channel number (frequency information).

In step 913, the UE 901 searches for wireless LAN APs based on the measurement gap setting information. According to another embodiment of the present invention, the UE 901 may search for the wireless LAN APs, even when the UE 901 does not receive the measurement gap setting information, if the UE 901 detects that intensity of a signal received from the serving ENB 905 is less than or equal to a signal intensity threshold. A process of searching for the wireless LAN APs is performed through the above-described passive scanning or active scanning. In step 915, the UE 901 transmits, to the serving ENB 905, a result report including information regarding the wireless LAN APs found through the wireless LAN AP search process. For example, the result report may be transmitted to the serving ENB 905 by using an RRC layer message. The information regarding the wireless LAN APs is acquired through the beacon or the probe response message received from the corresponding wireless LAN AP by the passive scanning or the active scanning. For example, the result report includes found wireless LAN AP identifiers (SSID, BSSID, or HESSID), a wireless LAN frequency channel number used for each of the found wireless LAN AP identifiers, load information, information indicating whether a connection to the Internet exists, and an authentication type.

In step 917, the serving ENB 905 updates a wireless LAN AP list managed by the serving ENB 905, according to a process such as that described herein with respect to step 617 of FIG. 6. In step 919, the serving ENB 905 determines whether to continuously provide a service to the UE 901 or connect the UE 901 to the wireless LAN AP based on signal intensity for each of the wireless LAN APs acquired from the result report, possibility of the connection, load information, and a current radio resource state of the serving ENB 905 (e.g., signal intensity/quality, load, etc.). When the serving ENB 905 determines to connect the UE 901 to the wireless LAN AP, the serving ENB 905 selects a wireless LAN AP that the UE 901 will access. When the serving ENB 905 determines to continuously provide the service without connecting the UE 901 to the wireless LAN AP, the serving ENB 905 terminates the operation.

In the present example, the serving ENB 905 determines to connect the UE 901 to the wireless LAN AP. In step 921, the serving ENB 905 instructs the UE 901 to access a particular selected wireless LAN AP. For example, the instruction may be transmitted to the UE 901 by using an RRC layer message that includes a BSSID of the particular wireless LAN AP.

In step 923, the UE 901 performs a process of accessing the particular wireless LAN AP corresponding to the BSSID acquired by the instruction of step 921. When an operation button of the UE 901 indicating whether to search for the wireless LAN AP is turned off, the UE 901 informs the user of the UE 901 that an accessible wireless LAN AP exists within the cell and requests the user to select whether to turn on the operation button. According to another embodiment of the present invention, the process of accessing the particular wireless LAN AP is performed in such a manner that the operation button is set to be automatically turned on after the UE 901 receives the instruction according to an arrangement preset by the service provider. The access process includes authentication and association processes through which the UE 901 may access the particular wireless LAN AP to transmit/receive data.

Figure 10:
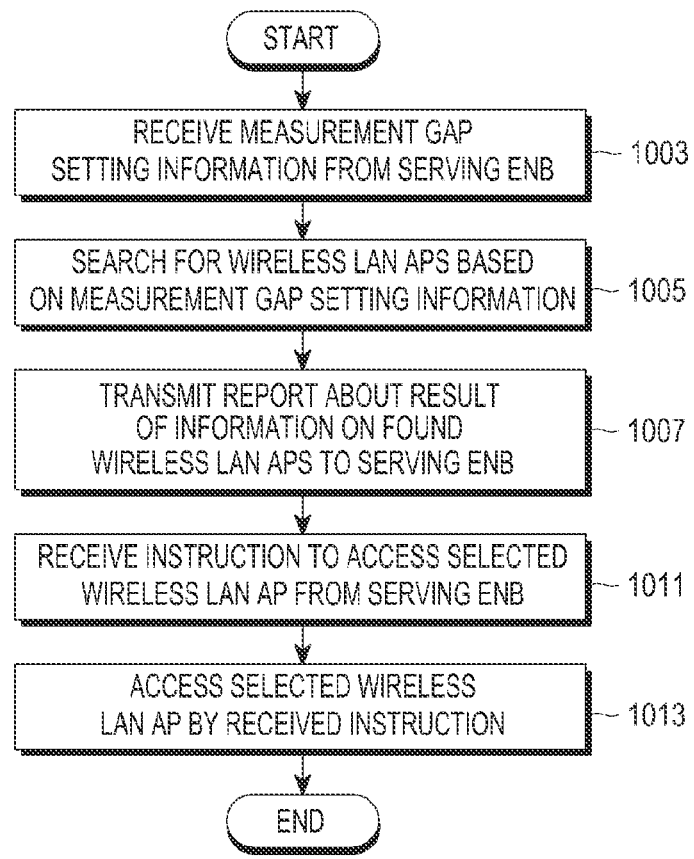
FIG. 10 is an operation flowchart illustrating a method performed by a UE according to the third embodiment of the present invention.

FIG. 10 is an operation flowchart illustrating a method performed by a UE according to a third embodiment of the present invention.

Referring to FIG. 10, in step 1003, the UE receives measurement gap setting information from the serving ENB. For example, the measurement gap setting information may use an RRC layer message. Further, the measurement gap setting information includes a time measurement gap, wireless LAN AP identifiers (SSID, BSSID, or HESSID), and a wireless LAN AP channel number (frequency information).

In step 1005, the UE searches for wireless LAN APs within the cell based on the received measurement gap setting information, through the above-described passive scanning or active scanning. Meanwhile, according to another embodiment of the present invention, when the UE does not receive the measurement gap setting information, the wireless LAN AP search may be performed even when intensity of a signal received from the serving ENB is less than or equal to a signal intensity threshold. In step 1007, the UE transmits, to the serving ENB, a result report including information regarding the wireless LAN APs found through the wireless LAN AP search process. For example, the result report may be transmitted by using an RRC layer message, and the information regarding the found wireless LAN APs may be acquired through the beacon or the probe response message received through the corresponding wireless LAN AP by passive scanning or active scanning. For example, the result report may include found wireless LAN AP identifiers (SSID, BSSID, or HESSID), a wireless LAN frequency channel number used for each of the found wireless LAN AP identifiers, load information, the existence or nonexistence of a connection to the Internet, and an authentication type.

Thereafter, in step 1011, the UE receives an instruction indicating an access to a particular wireless LAN AP from the serving ENG. The instruction includes the wireless LAN AP identifiers included in the result report and a particular wireless LAN AP identifier selected by the serving ENB. The particular wireless LAN AP is determined, by the serving ENB, based on information acquired from the result report according to the process described herein with respect to step 919 of FIG. 9 and a current radio resource state of the serving ENB.

In step 1013, the UE accesses the particular wireless LAN AP corresponding to the particular wireless LAN AP identifier acquired from the instruction of step 1011, according to a process described herein with respect to step 923 of FIG. 9.

Thereafter, the UE accesses the particular wireless LAN AP to transmit/receive data.

Figure 11:
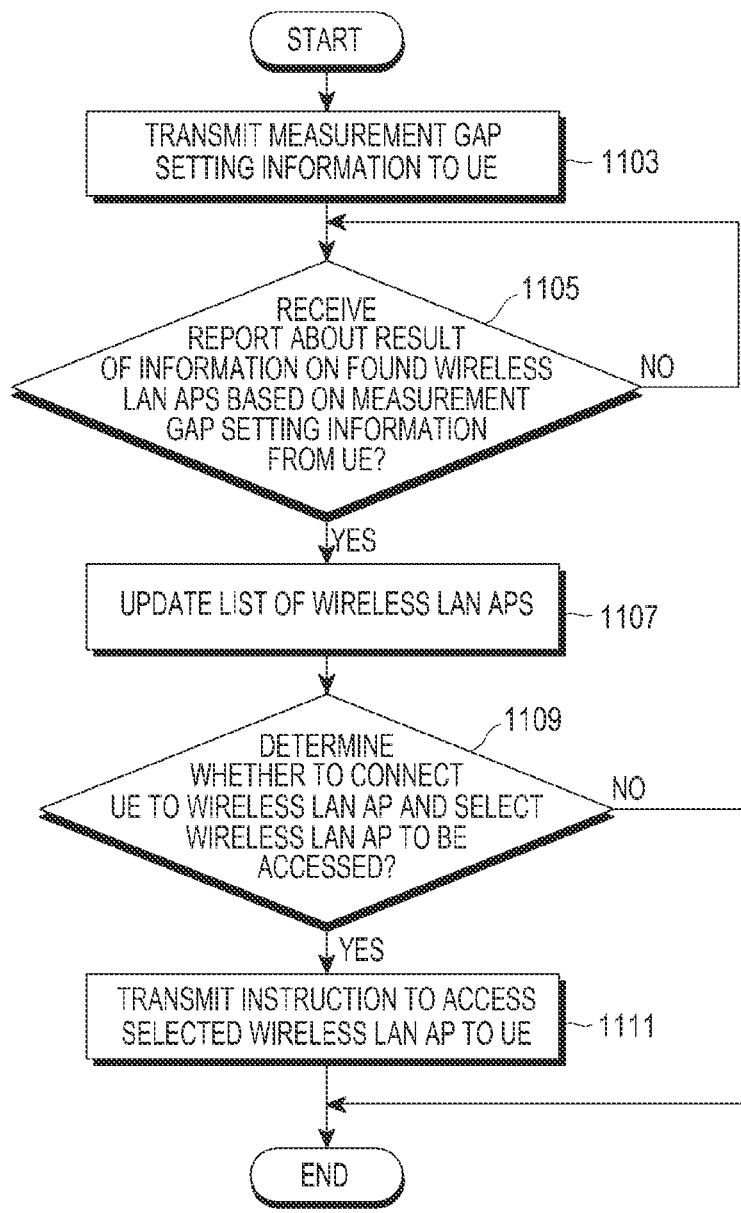
FIG. 11 is an operation flowchart illustrating a method performed by a serving ENB according to the third embodiment of the present invention.

FIG. 11 is an operation flowchart illustrating a method performed by a serving ENB according to the third embodiment of the present invention.

Referring to FIG. 11, the serving ENB transmits measurement gap setting information to the UE, in step 1103. For example, the measurement gap setting information may be transmitted using an RRC layer message. Further, the measurement gap setting information includes a time measurement gap, wireless LAN AP identifiers (e.g., SSID, BSSID, or HESSID), and a corresponding wireless LAN AP channel number (e.g., frequency information).

In step 1102, the serving ENB waits for reception of a result report of information regarding the found wireless LAN APs from the UE according to the measurement gap setting information. Alternatively, the serving ENB may receive the result report of the information regarding the found wireless LAN APs in a state where signal intensity of the UE is less than or equal to a signal intensity threshold. When the result report is not received, the serving ENB waits until the result report is received.

When the result report is received, the serving ENB updates the wireless LAN AP list already managed by the serving ENB, in step 1107, in a manner similar to that described herein with respect to step 617 of FIG. 6. The wireless LAN AP list includes wireless LAN APs within the cell of the serving ENB managed by the service provider of the mobile communication network including the serving ENB. In step 1109, the serving ENB 905 determines whether to continuously provide a service to the UE or connect the UE to the wireless LAN AP based on signal intensity for each of the wireless LAN APs acquired from the result report, possibility of the connection, load information, and a current radio resource state of the serving ENB (e.g., signal intensity/quality, load, etc.). When the serving ENB determines to connect the UE to the wireless LAN AP, the ENB selects a wireless LAN AP that the UE will access and proceeds to step 1111. When the serving ENB 905 determines to continuously provide the service without connecting the UE to the wireless LAN AP, the serving ENB terminates the operation.

In step 1111, the serving ENB transmits an instruction regarding access to the particular selected wireless LAN AP. For example, the instruction may be transmitted to the UE by using an RRC layer message that includes an identifier of the particular wireless LAN AP.

As described above, the serving ENB according to the third embodiment of the present invention directly determines whether to connect the UE to the wireless LAN AP and selects the wireless LAN AP for the access and transmits the instruction of the access to the selected wireless LAN AP to the UE. Accordingly, the serving ENB may select an optimal wireless LAN AP that the UE will access and allow the UE to access the optimal wireless LAN AP.

Figure 12:
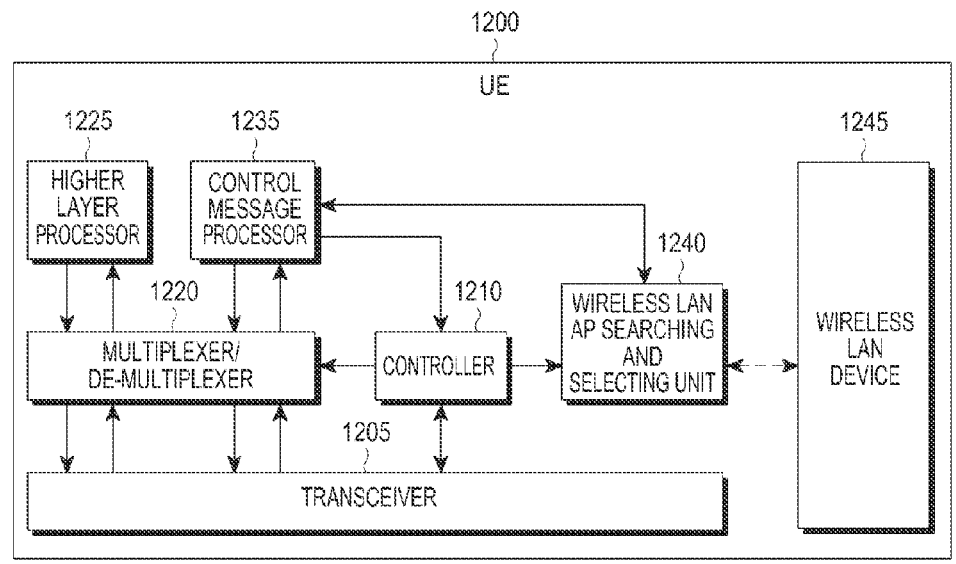
FIG. 12 is a block diagram of a UE according to an embodiment of the present invention.

FIG. 12 is a block diagram illustrating a UE according to an embodiment of the present invention.

Referring to FIG. 12, a UE 1200 according to an embodiment of the present invention includes a transceiver 1205, a controller 1210, a multiplexer/de-multiplexer 1220, a control message processor 1235, a higher layer processor 1225, a wireless LAN AP searching and selecting unit 1240, and a wireless LAN device 1245.

The transceiver 1205 receives data and a predetermined control signal through a forward channel of a serving ENB and transmits data and a predetermined control signal through a backward channel. When the UE is connected with a plurality of serving ENBs, the transceiver 1205 transmits/receives data and a control signal through each of the plurality of serving ENBs.

The multiplexer/de-multiplexer 1220 multiplexes data generated by the higher layer processor 1225 or the control message processor 1235 and de-multiplexes data received from the transceiver 1205 and transmits the multiplexed data or control signal or de-multiplexed data to the higher layer processor 1225 or the control message processor 1235.

The control message processor 1235 operations according to the control messages received from the serving ENB. The higher layer processor 1225 may be configured for each service. The higher layer processor 1225 processes data generated by a user service such as a File Transfer Protocol (FTP) or Voice over Internet Protocol (VoIP) and transmits the processed data to the multiplexer/de-multiplexer 1220 or processes data transmitted from the multiplexer/de-multiplexer 1220 and transmits the processed data to a service application of a higher layer.

The controller 1210 identifies a signal received through the transceiver 1205 and controls the transceiver 1205 and the multiplexer/de-multiplexer 1220 to perform corresponding operations.

In the present example according to an embodiment of the present invention, the UE 1200 includes the wireless LAN device 1245 that may access the wireless LAN AP to perform communication. In the first embodiment or the second embodiment of the present invention described herein above, the transceiver 1205 receives the information on the wireless LAN APs within the cell from the serving ENB. Then, the controller 1210 identifies whether the information on the wireless LAN APs includes an instruction of an access to a particular wireless LAN AP.

As a result of the identification, when the information on the wireless LAN APs does not include the instruction to access the particular wireless LAN AP, the controller 1210 controls the wireless LAN AP searching and selecting unit 1240 to search for wireless LAN APs within the cell based on the information on the wireless LAN APs in a manner described according to the first embodiment the second embodiment of the present invention. The process of searching for the wireless LAN APs is performed by passive scanning or active scanning only for the wireless LAN APs corresponding to wireless LAN identifiers included in the request for searching for the information on the wireless LAN APs within the cell.

The information on the wireless LAN APs within the cell includes wireless LAN identifiers for identifying particular wireless LAN APs requested by the serving ENB and wireless LAN channel information. The wireless LAN identifier includes the SSID, the BSSID, or the HESSID defined in Table 1. The controller 1210 controls the transceiver 1205 to transmit a result report including the including information on the found wireless LAN APs to the serving ENB. The result report may use, for example, an RRC layer message. The information regarding the wireless LAN APs is acquired through a beacon or a probe response message received from the corresponding wireless LAN AP by passive scanning or active scanning. For example, the information on the wireless LAN APs include wireless LAN identifiers (e.g., SSID, BSSID, or HESSID) of the found wireless LAN APs, wireless LAN frequency channel numbers used by the found wireless LAN APs, load information of the found wireless LAN APs, information on whether the found wireless LAN APs are connected to the Internet, and authentication types of the found wireless LAN APs.

Thereafter, according to the first embodiment of the present invention, the controller 1210 controls the wireless LAN AP searching and selecting unit 1240 to determine and select accessible APs from among the found wireless LAN APs, such as described herein with respect to step 335 of FIG. 3.

According to the second embodiment of the present invention, according to the instruction of the controller 1210, the transceiver 1205 receives information on the wireless LAN APs updated by the serving ENB based on the result report in the broadcast or unicast scheme. Then, the controller 1210 determines whether to search for the wireless LAN APs within the cell based on information such as a movement speed of the UE 1200 already possessed through the mobile communication network as well as the updated information on the wireless LAN APs, such as described herein with respect to step 631 of FIG. 6. The controller 1210 controls the wireless LAN AP searching and selecting unit 1240 to determine and select accessible wireless LAN APs from among the found wireless LAN APs, such as described herein with respect to step 635 of FIG. 6.

The wireless LAN AP searching and selecting unit 1240 performs the access to the selected wireless LAN AP according to an instruction of the controller 1210.

As a result of the identification, the information on the wireless LAN APs includes the instruction to access to the particular wireless LAN AP, the controller 1210 controls the wireless LAN AP searching and selecting unit 1240 to perform the access to the wireless LAN AP corresponding to an identifier of the particular wireless LAN AP acquired from the access instruction according to the third embodiment of the present invention.

Figure 13:
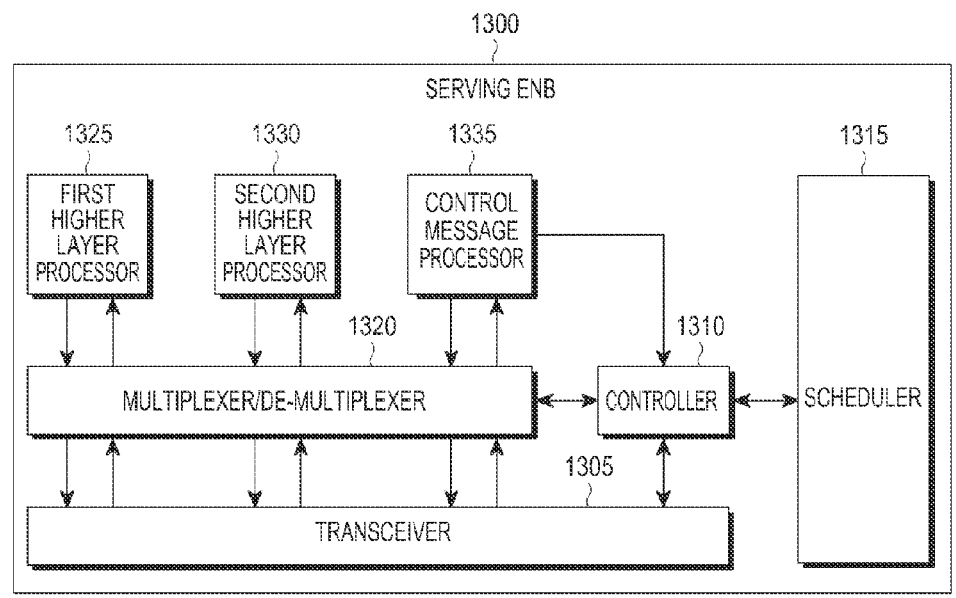
FIG. 13 is a block diagram of a serving ENB according to an embodiment of the present invention.

FIG. 13 is a block diagram illustrating a serving ENB according to an embodiment of the present invention.

Referring to FIG. 13, a serving ENB 1300 includes a transceiver 1305, a controller 1310, a multiplexer/de-multiplexer 1320, a control message processor 1335, first and second higher layer processors 1325 and 1330, and a scheduler 1315.

The transceiver 1305 transmits data and a predetermined control signal through a forward carrier and receives data and a predetermined control signal through a backward carrier. When a plurality of carriers are set, the transceiver 1305 transmits/receives data and a predetermined signal through the plurality of carriers.

The multiplexer/de-multiplexer 1320 multiplexes data generated by the first and second higher layer processors 1325 and 1330 or the control message processor 1335 and de-multiplexes data received by the transceiver 1305 and transmits the multiplexed data or the de-multiplexed data to the corresponding first and second higher layer processor 1325 and 1330, the control message processor 1335, or the controller 1310. The control message processor 1335 processes a control message transmitted by the UE or generates a control message to be transmitted to the UE and transmits the control message to a lower layer.

The first and second higher layer processors 1325 and 1330 may be configured for each service of each UE. The first and second higher layer processors 1325 and 1330 process data generated by a user service such as FTP or VoIP and transmit the processed data to the multiplexer/de-multiplexer 1320 or processes data transmitted from the multiplexer/de-multiplexer 1320 and transmits the processed data to a service application of a higher layer.

The scheduler 1315 allocates transmission resources to the UE based on a buffer state of the UE, a channel state, and active time of the UE and allows the transceiver to process a signal transmitted by the UE or transmit a signal to the UE.

The serving ENB 1300 transmits information on wireless LAN APs helping UEs within the cell of the serving ENB 1300 to access to the wireless LAN APs in a manner described herein according to the first embodiment and the second embodiment of the present invention or determines whether to directly connect the corresponding UE to the wireless LAN AP and the wireless LAN AP for the access in a manner described herein according to the third embodiment of the present invention.

Specifically, after transmitting the information on the wireless LAN APs through the transceiver 1305, the controller 1310 waits for reception of information on the found wireless LAN APs from the UE based on the information on the wireless LAN APs. The controller 1310, according to the second embodiment and the third embodiment of the present invention, updates the already managed wireless LAN AP list based on a result report, such as described herein with respect to step 617 of FIG. 6 and step 917 of FIG. 9, respectively.

Meanwhile, in order to acquire the information regarding the wireless LAN APs, the controller 1310, according to the first embodiment of the present invention, requests information regarding wireless LAN APs within the cell to the AP position management server 309 installed in the mobile communication system and receives the requested information in response, such as described with respect to steps 311 to 313 of FIG. 3. The controller 1310 transmits the information on the wireless LAN APs acquired from the AP position management server 309 to the UE, so that the corresponding UE is able to search for the wireless LAN APs and select accessible wireless LAN APs based on the information on the wireless LAN APs, thereby reducing unnecessary wireless LAN AP searching operations by the UE.

The controller 1310, according to the second embodiment of the present invention, re-transmits updated information regarding the wireless LAN APs to the UE, so that the UE is able to search for the wireless LAN APs and select accessible wireless LAN APs based on the updated information on the wireless LAN APs, thereby reducing unnecessary wireless LAN AP searching operations by the UE.

The controller 1310, according to the third embodiment of the present invention, determines whether to connect the corresponding UE to the wireless LAN AP based on the updated information on the wireless LAN APs and it own current radio resource state. When the controller 1310 determines to connect the UE to the wireless LAN AP, the controller 1310 directly selects the wireless LAN AP that the UE will access, such as described herein with respect to steps 917 to 919 of FIG. 9. Thereafter, the controller 1310 transmits an instruction to access to the selected wireless LAN AP to the UE, through the transceiver 1305.

As is apparent from the foregoing description, the present invention provides methods in which, when a mobile communication network and a wireless LAN interwork with each other, a serving Evolved Node B (ENB) provides a UE with information for helping the UE search for wireless LAN APs within a cell through a server providing the information or the ENB directly provides the UE with the information, the UE updates information on the already managed wireless LAN APs based on the found wireless LAN APs, and the serving ENB directly selects wireless LAN APs which the UE will access from among the updated wireless LAN APs and transmits the selected wireless LAN APs to the UE. Through the methods, it is possible to reduce unnecessary wireless LAN AP searching operations performed by the UE and thus reduce resource waste and delay time.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for searching at least one wireless network by a User Equipment (UE) in a mobile communication system, the method comprising:

receiving request information for searching at least one wireless network from an evolved Node B (eNB);

searching the at least one wireless network based on the request information;

transmitting report information including a result of the search to the eNB;

receiving, from the eNB, updated information on the at least one wireless network based on the search result;

determining whether to perform re-searching of the at least one wireless network based on the updated information; and searching at least one wireless network to be accessed based on the determination, wherein if mobility information indicates that a moving speed of the UE is less than or equal to a reference value, performing the re-searching.

2. The method of claim 1, wherein the re-searching of the at least one wireless network is performed regardless of a search setting for a wireless network within the UE.

3. The method of claim 1, wherein determining whether to perform re-searching comprises:

if the updated information indicates that a wireless network installed within a service coverage of the eNB does not exist, determining not to perform the re-searching.

4. The method of claim 1, wherein determining whether to perform re-searching comprises:

if the updated information indicates that a wireless network installed within a service coverage of the eNB does not exist and the re-searching is activated within the UE, determining not to perform the re-searching.

5. A method for supporting selection of at least one wireless network of a User Equipment (UE) by a evolved Node B (eNB) in a mobile communication system, the method comprising:

transmitting request information for searching at least one wireless network to a UE;

receiving report information including a result of a search based on the request information from the UE; and generating updated information on the at least one wireless network based on the search result, and transmitting the updated information to the UE, wherein the updated information is used for determining whether to perform re-searching of the at least one wireless network based on the updated information by the UE, wherein if mobility information indicates that a moving speed of the UE is less than or equal to a reference value, the re-searching is performed.

6. The method of claim 5, wherein the re-searching of the at least one wireless network is performed regardless of a search setting for a wireless network within the UE.

7. The method of claim 5, wherein if the updated information indicates that a wireless network installed within a service coverage of the eNB does not exist, the re-searching is not performed.

8. The method of claim 5, wherein if the updated information indicates that a wireless network installed within a service coverage of the eNB does not exist and the re-searching is activated within the UE, the re-searching is not performed.

9. A User Equipment (UE) for searching at least one wireless network in a mobile communication system, the UE comprising:
   a receiver configured to receive request information for searching at least one wireless network from an evolved Node B (eNB) and receive updated information on the at least one wireless network based on a result of the search from the eNB;
   a controller configured to search the at least one wireless network based on the request information, determine whether to perform re-searching of the at least one wireless network based on the updated information, and search at least one wireless network to be accessed based on the determination; and
   a transmitter configured to transmit report information including the search result to the eNB,
   wherein if mobility information indicates that a moving speed of the UE is less than or equal to a reference value, the controller configured to perform the re-searching.

10. The UE of claim 9, wherein the re-searching of the at least one wireless network is performed regardless of a search setting for a wireless network within the UE.

11. The UE of claim 9, wherein if the updated information indicates that a wireless network installed within a service coverage of the eNB does not exist, the controller is further configured to determine not to perform the re-searching.

12. The UE of claim 9, wherein if the updated information indicates that a wireless network installed within a service coverage of the eNB does not exist and the re-searching is activated within the UE, the controller is further configured to determine not to perform the re-searching.

13. A evolved Node B (eNB) for supporting selection of at least one wireless network of a User Equipment (UE) in a mobile communication system, the method comprising:
   a transmitter configured to transmit request information for searching at least one wireless network to a UE, and transmit updated information to the UE;
   a receiver configured to receive report information including a result of a search based on the request information from the UE; and
   a controller configured to generate the updated information on the at least one wireless network based on the search result,
   wherein the updated information is used for determining whether to perform re-searching of the at least one wireless network based on the updated information by the UE, and
   wherein if mobility information indicates that a moving speed of the UE is less than or equal to a reference value, the re-searching is performed.

14. The eNB of claim 13, wherein the re-searching of the at least one wireless network is performed regardless of a search setting for a wireless network within the UE.

15. The eNB of claim 13, wherein if the updated information indicates that a wireless network installed within a service coverage of the eNB does not exist, the re-searching is not performed.

16. The eNB of claim 13, wherein if the updated information indicates that a wireless network installed within a service coverage of the eNB does not exist and the re-searching is activated within the UE, the re-searching is not performed.

\* \* \* \* \*